March 19, 1963 R. E. KOSIN ETAL 3,081,597
VARIABLE THRUST VECTORING SYSTEMS DEFINING CONVERGENT NOZZLES
Filed Dec. 6, 1960 5 Sheets-Sheet 3

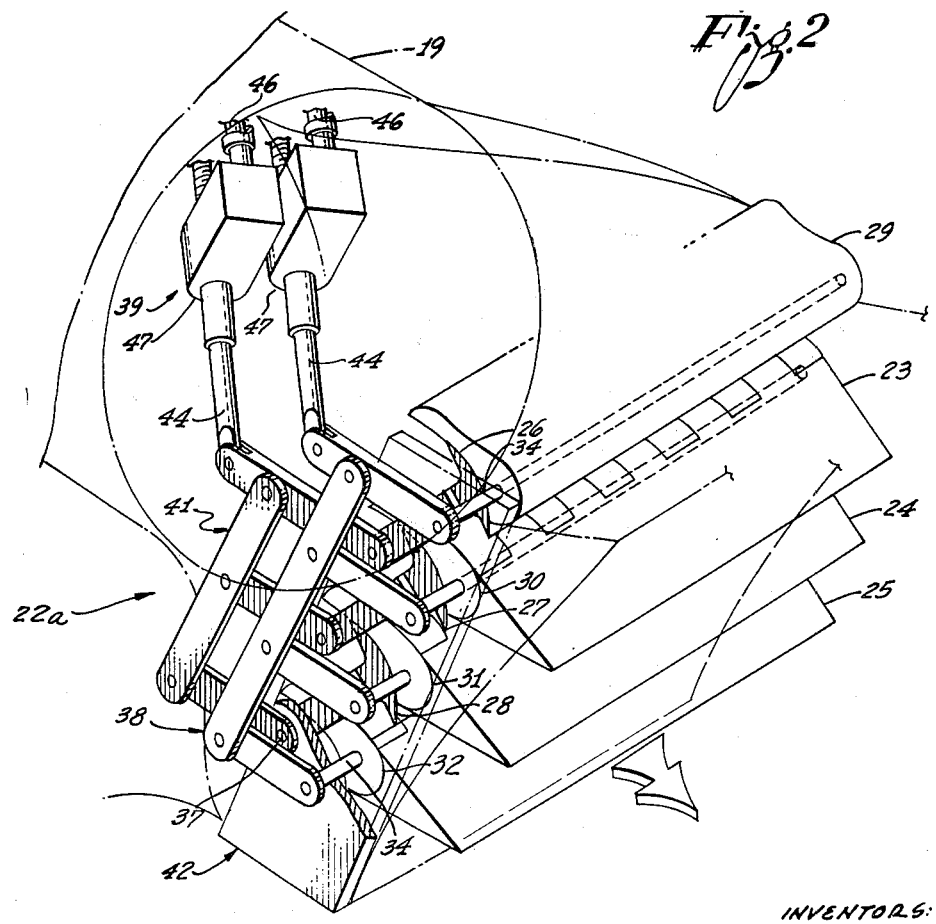

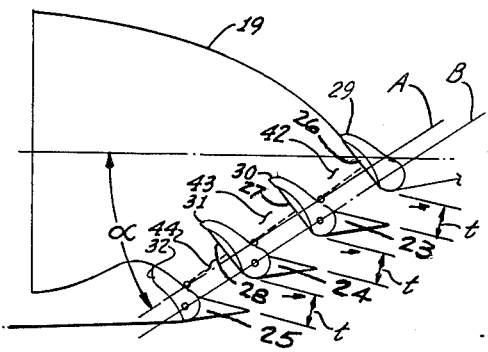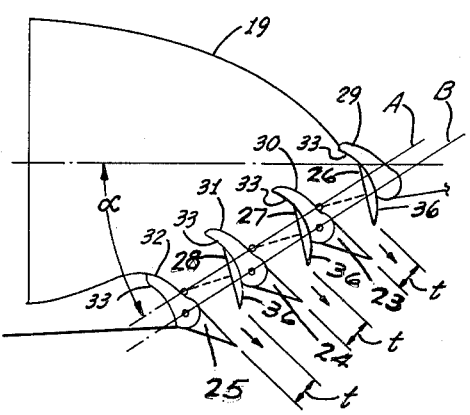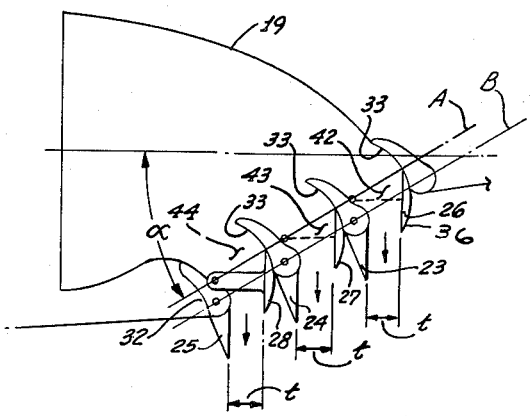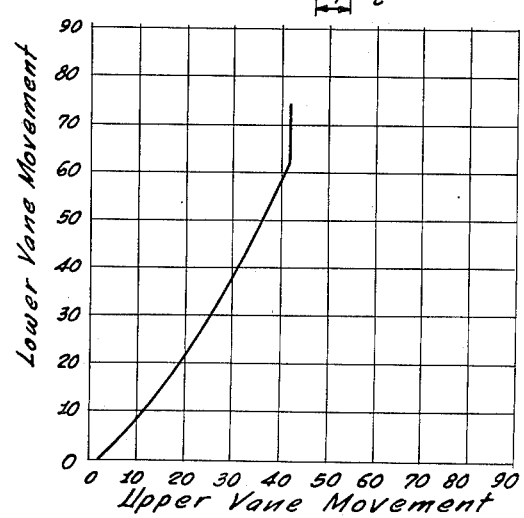

INVENTORS:
Ruediger E. Kosin
William G. Stuart

By Willard M. Graham
Agent.

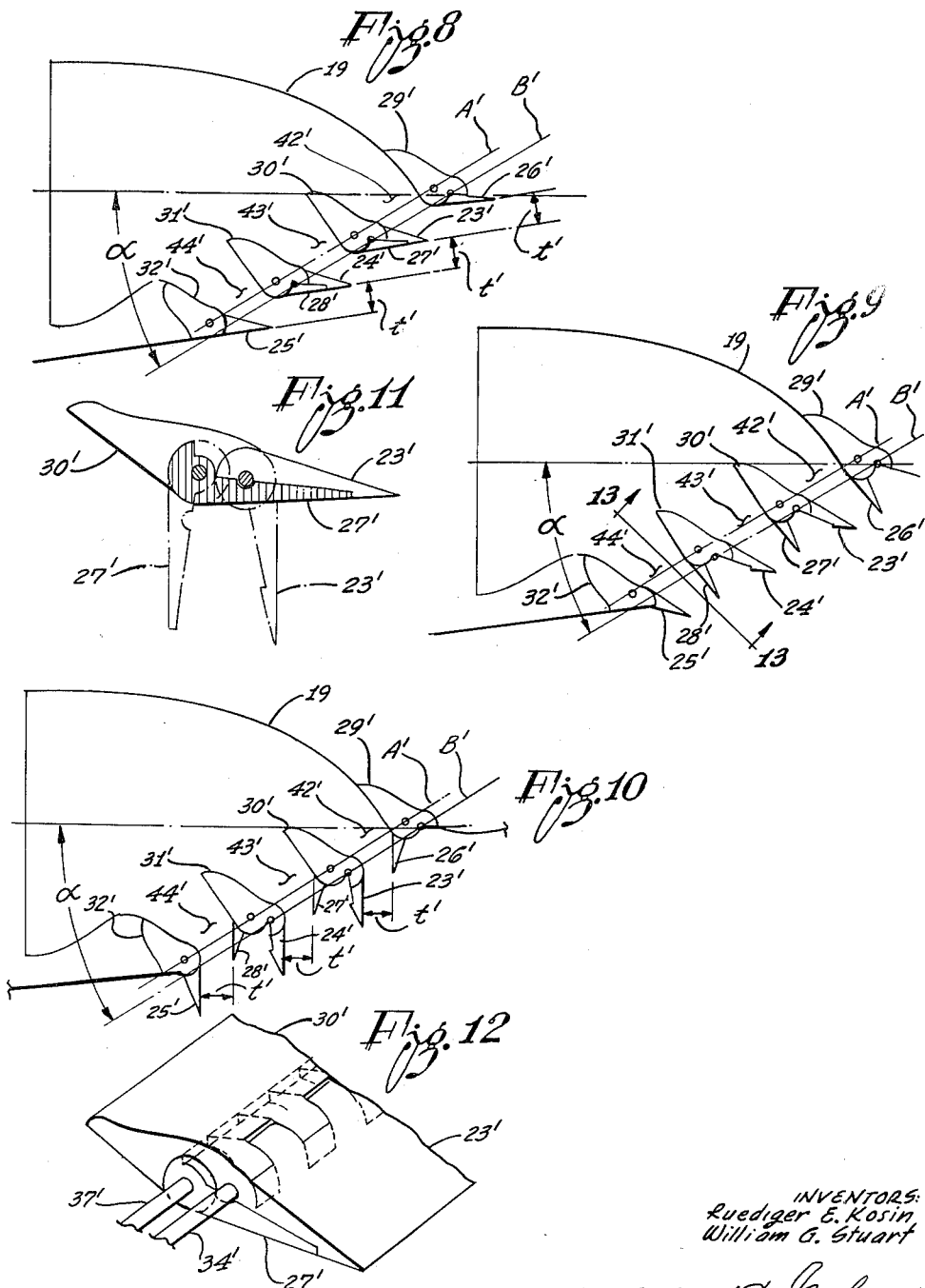

INVENTORS:
Ruediger E. Kosin,
William G. Stuart

By Willard M. Graham
Agent.

United States Patent Office 3,081,597
Patented Mar. 19, 1963

3,081,597
VARIABLE THRUST VECTORING SYSTEMS DEFINING CONVERGENT NOZZLES
Ruediger E. Kosin, Palos Verdes Estates, and William G. Stuart, San Pedro, Calif., assignors to Northrop Corporation, Beverly Hills, Calif., a corporation of California
Filed Dec. 6, 1960, Ser. No. 74,136
4 Claims. (Cl. 60—35.54)

This invention relates to improvements in aircraft and more particularly to thrust vectoring means adapted to be utilized in connection with jet type aircraft enabling the latter to effect VTOL/STOL and normal take-off and landing operations and also to effect transitions between VTOL/STOL operations and normal cruise operations.

Numerous types of aircraft have been proposed embodying features enabling an aircraft to effect VTOL, STOL and conventional take-off and landing operations and also to effect a transition between a VTOL or STOL operation and conventional flight operations. To the best of Applicants' knowledge all such aircraft designed to provide the above capabilities have been unwieldy, heavy, costly and inefficient in their operation and, therefore, have left much to be desired.

Accordingly, an object of this invention is to provide an improved thrust vectoring device enabling a jet type aircraft on which the device is mounted to effect VTOL, STOL and conventional operations and combinations thereof.

Another object is to provide an improved thrust vectoring device having utility in connection with an aircraft designed to fly at speeds of less than the speed of sound and in which the device defines convergent nozzles as the device is actuated throughout its operating range. It is well known that convergent nozzles constitute the most efficient nozzles for an aircraft of the above type, this statement will be clarified as the specification progresses.

The above and other objects of the invention are attained by a thrust vectoring device which is mounted on a jet aircraft in the flow path of the exhaust gases of the aircraft's engine. The thrust vectoring device constitutes a plurality of fixed and movable vanes having a juxtaposed and cascaded relation and which cooperate to define a plurality of convergent nozzles.

The capital letters "VTOL" and "STOL" as used throughout this specification refer to aircraft having vertical take-off and short take-off and landing capabilities, respectively.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a side view of an aircraft embodying a jet type engine and exhaust gas deflector means of the type disclosed herein.

FIGURE 2 is an enlarged perspective view of one embodiment of the deflecting means shown in FIGURE 1.

FIGURES 3, 4 and 5 are schematic views showing the vanes comprising the deflector means of FIGURE 2 in their cruise, STOL AND VTOL positions, respectively.

FIGURE 6 graphically shows the movement of one vane of the deflector means of FIGURE 2 with respect to other vanes of the deflector.

Figure 7:
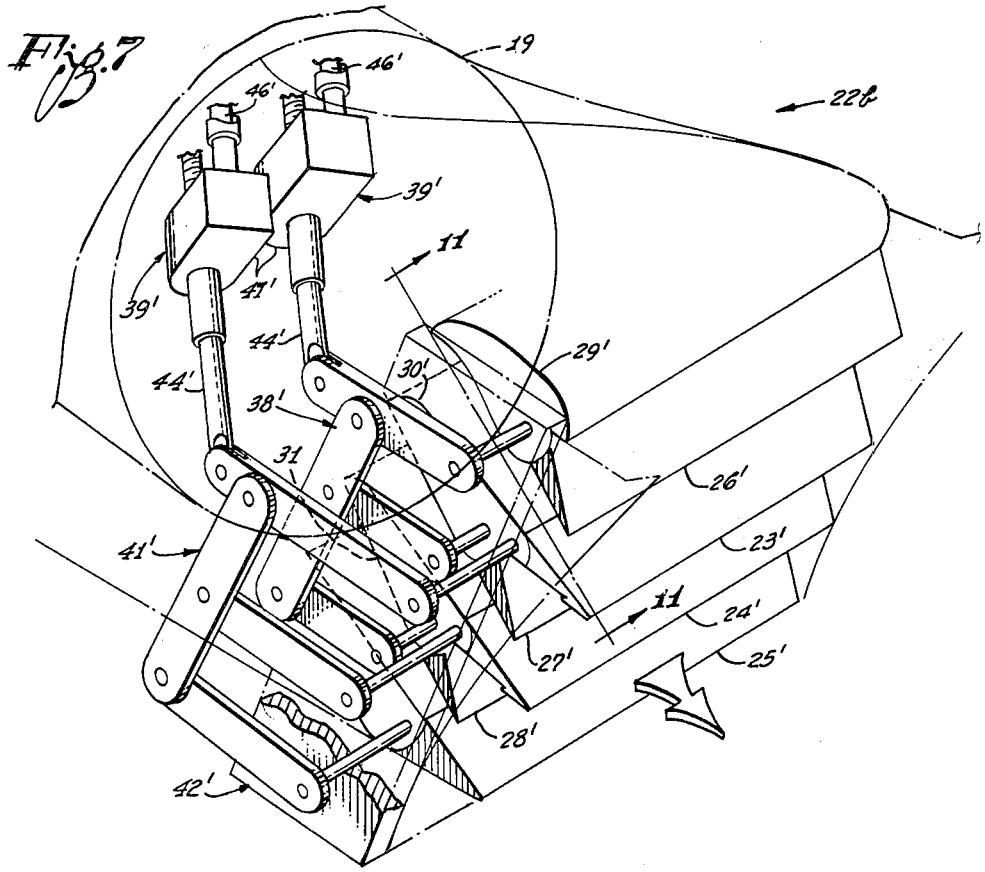

FIGURE 7 is an enlarged perspective view of another embodiment of the deflecting means of FIGURE 1.

FIGURES 8, 9 and 10 are schematic views showing the vanes comprising the deflector means of FIGURE 7 in their cruise, STOL and VTOL positions, respectively.

FIGURE 11 is a fragmentary sectional view of the deflector means of FIGURE 7, the section being taken on the line 11—11 of FIGURE 7.

FIGURE 12 is a fragmentary perspective view showing a typical hinge connection between the fixed and movable vanes of the deflector means of FIGURE 7.

Figure 13:
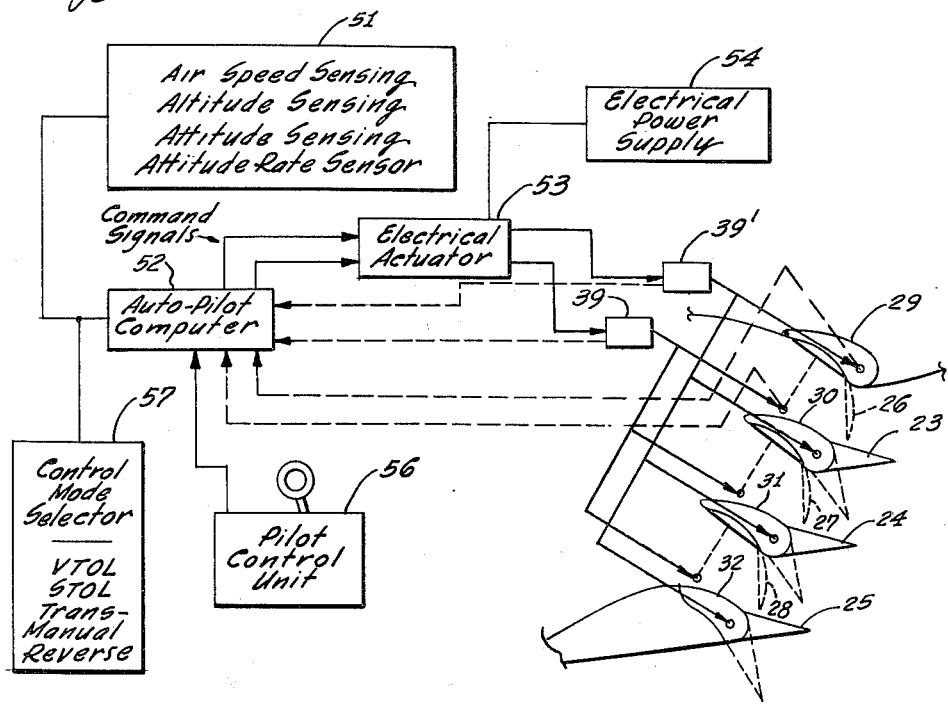

FIGURE 13 is a schematic view showing a control system for controlling and actuating the deflector means of FIGURES 2 and 7.

Figure 14:
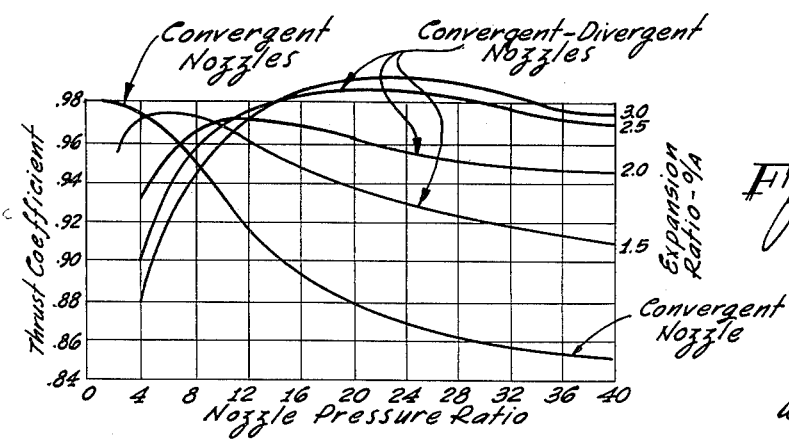

FIGURE 14 graphically shows the comparative efficiency of convergent nozzles as against convergent-divergent nozzles at various nozzle pressure ratios.

Figure 15:
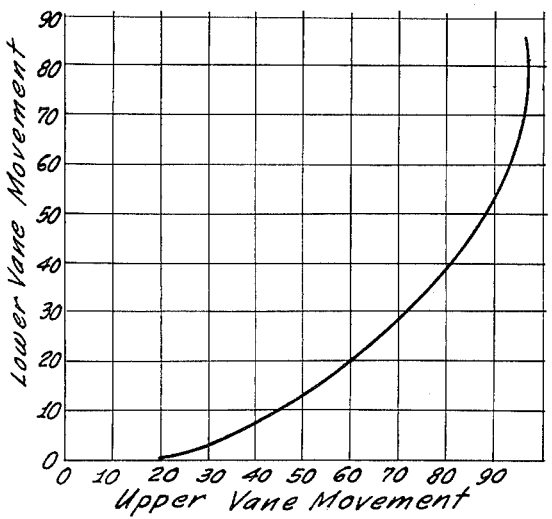

FIGURE 15 graphically shows the movement of one vane of the deflector means of FIGURE 7 with respect to other vanes of the deflector.

Referring now to the drawings, FIGURE 1 shows a jet propelled airplane 11 having a fuselage 12, wings 14, horizontal tail surfaces 16 and a vertical tail fin 17. Propulsion for the airplane is provided by a turbine-type engine 18 the exhaust from which is directed through a tail pipe 19 and exhaust at a location near the longitudinal center of the airplane 11. Air enters the engine 18 through a pair of intake ducts 21 located respectively on each side of the fuselage 12. In the embodiment shown the deflector means 22 is mounted at the aft end of the tail pipe 19 at a position approximately below the center of gravity of the airplane 11. The tail pipe 19 as it exits from the airplane 11 is rectangular in cross-section and accordingly provides suitable structure for mounting the deflector means 22. Although only one deflector means 22 is shown in FIGURE 1, it should be understood that more than one deflector means may be incorporated in the airplane 11 and their locations made compatible with the type of engine, ducting, etc. utilized.

Details of one embodiment of the deflector means 22 are shown in FIGURE 2, this embodiment being identified in its entirety by the numeral 22a. By referring to FIGURE 2 it will be seen that the embodiment 22a consists of a first set of movable vanes 23, 24 and 25, a second set of movable vanes 26, 27 and 28 and a set of fixed or non-movable vanes 29, 30, 31 and 32. The two sets of movable vanes and the fixed set of movable vanes are assembled, in a manner to be described as the specification progresses, to define three nozzles 42, 43 and 44. By referring to FIGURES 3, 4 and 5 it will be seen that the first set of movable vanes 23, 24 and 25 constitute in part the lower confining surfaces of the nozzles 42, 43 and 44, and therefore, are referred to hereafter as lower vanes. Likewise it will be seen that the second set of movable vanes 26, 27 and 28 constitute in part the upper confining surfaces of the nozzles 42, 43 and 44, accordingly they are referred to hereafter as upper vanes.

The fixed vanes 29 and 32 are secured in parallel relation to the top and bottom walls, respectively, of the tail pipe 19 at the exit end thereof. The fixed vanes 30 and 31 are in turn equally spaced between and have a parallel relation with respect to the vanes 29 and 32. As best seen in FIGURES 3, 4 and 5 the vanes 29-32 have a staggered or cascaded relation. The cross-sectional configuration of the vanes 29-32 are best seen by referring to FIGURES 2-5, and are characterized in that their lower surfaces define cylindrical surfaces 33 having equal radii the centers of which are located in a common plane identified by the letter "A."

The lower vanes 23, 24 and 25 are substantially wedge shaped in cross-section. The blunt ends of the lower vanes are secured to the aft ends of the fixed vanes 30, 31 and 32 for pivotal movement thereon by means of piano type hinges. Angular movement of the lower vanes 23, 24, 25 is imparted thereto by respective shafts 34 (FIGURE 2) which constitute the axes of the aforementioned piano type hinges. Bearings for the shafts 34 are provided by the fixed vanes 29–32 as their axes lie in a common plane identified by the letter "B'" (FIGURES 3, 4 and 5).

The upper vanes 26, 27 and 28 are substantially T-shaped in cross-section and are characterized in that the upper surfaces of their cross portions constitute cylindrical surfaces 36 having the same radii as the cylindrical surfaces 33. In their assembled relation it will be seen that the pivotal axes of the upper vanes coincide with the centers of the cylindrical surfaces 33 and, therefore, the cylindrical surfaces 33 and 36 have a contacting and mating relationship. Angular movement of the upper vanes 26, 27 and 28 is imparted thereto by respective shafts 37 (FIGURE 2), the axes of which constitute the respective pivotal axes of the upper vanes and, therefore, are located in the common plane "B."

Equal and simultaneous angular movement is imparted to the lower vanes 23–25 by a common linkage assembly 38. Pivotal movement is imparted to the uppermost link of the assembly 38 by a conventional screw jack assembly 39, it will be apparent that movements of the assembly 39 will be imparted to each of the lower vanes. Also equal and simultaneous movement is imparted to the upper vanes 26–28 by a common linkage assembly 41. Pivotal movement is imparted to the uppermost link of the assembly 41 by a conventional screw jack assembly 39, it will be apparent that this movement will be imparted to each of the upper vanes.

The linkage assemblies 38 and 41, also the shafts 34 and 37, are supported in rack members 42. Although only one set of linkage assemblies 38 and 41 are shown in FIGURE 2 it should be understood that a linkage assembly should be provided on each side of the deflector means 22. The above arrangement reduces the likelihood of distorting and binding which otherwise would unquestionably occur between the upper and lower vanes.

As previously mentioned the airplane 11 is intended to function at subsonic speeds only. Accordingly an engine having a low pressure ratio is selected for this type of aircraft. A convergent nozzle functions most efficiently with this type of engine as is well known in the art as graphically illustrated in FIGURE 14. By referring to this figure it will be seen that at low pressure ratios a convergent nozzle utilizes approximately ninety-eight percent (98%) of a jet engine's thrust while convergent-divergent nozzles are far less effective. It, therefore, becomes important that the fixed and movable vanes of the deflector means 22a cooperate to define convergent nozzles only as the movable vanes are actuated through their respective angular ranges. It is also important, if a turbine engine is to operate at its maximum efficiency throughout its operating range, that the cross-sectional dimension "t" of the throat of the nozzle through which its exhaust should be maintained constant. The above conditions were kept in mind during the design of the deflector means 22a and these parameters and conditions are made possible by the subject deflector means.

Referring again to FIGURES 2–5 it will be seen that the fixed, upper and lower vanes cooperate to define the convergent nozzles 42, 43 and 44 as the two latter sets of vanes are moved throughout their respective ranges, that is between their cruise positions (FIGURE 3) and their VTOL positions (FIGURE 5). In view of the above it will now be apparent that the cross-sectional areas of the nozzles 42, 43 and 44, at their respective throats, are also maintained constant. It will also be noted, in the assembled relationship of the deflector means 22 in the airplane 11, that the angle included between the longitudinal axis thereof and the aforementioned planes "A" and "B," also the included angle between the axis of the tail pipe 19 and the planes "A" and "B," constitute acute angles of approximately 30° which angle is identified by the Greek letter α. The angle α (hereinafter referred to as the rack angle of the deflector means 22a, insures the aforementioned cascade-like arrangement of the nozzles 42, 43 and 44 in their relationship in the airplane 11 substantially as shown in FIGURE 1.

Pivotal movement is imparted to the upper and lower vanes 26–28 and 23–25, respectively, by the aforementioned jack assemblies 39. The output members 44 of the jack assemblies are pivotally attached to the bifurcated ends of the uppermost links of the linkage assemblies 38 and 41. Rotational movement is imparted to the jack assemblies 39 by means of flexible shafts 46 or the like; this movement is in turn converted into linear movement by suitable gear means 47 comprising an integral part of the jack assemblies 39. Thus it will be seen that rotary movement of the flexible shafts 46, either in a clockwise or counter-clockwise direction, will be imparted to the vanes 23–25 and 26–28 according to the amount and direction of rotation of the shafts 46.

The control means schematically shown in FIGURE 13 comprises means for controlling movement of the respective vanes of the deflector means 22a. The means shown in FIGURE 13 constitute conventional components and represent merely one of several systems which may be utilized to control the movement of the upper and lower vanes 26–28 and 23–25, respectively. Briefly the system shown includes a device or devices 51 for sensing the air speed, altitude and attitude and rate of change in the altitude of the airplane 11. Signals from the device 51 are transmitted to a summation computer, for example the auto-pilot computer 52. Command signals from the computer 52 are in turn transmitted to an actuator 53 and corresponding mechnical movements are transmitted by suitable mechanical linkage assemblies for example the screw jack 39 and 39', to the upper and lower vanes 26–28 and 23–25, respectively. Feedback signals, shown by the broken lines in FIGURE 13 returned to the computer 52 indicate the instantaneous positions of the upper and lower vanes. Upon proper movement of the upper and lower vanes the feedback signals cancel the command signals and further command signals are not transmitted to the actuator 53 and further movement of the vanes 23–25 and 26–28 are precluded until different signals as are again fed to the computer 52 or the air speed, altitude, attitude, etc. of the airplane 11 changes. Power for the actuator 53 is provided by a power source 54.

The sensing device 51 and signals received therefrom constitute an automatic control system, however, signals from the sensing means 51 may be over-ridden by a pilot actuated control unit 56 or by a semiautomatic mode selector 57. By utilizing the selector 57, the vanes 23–25 and 26–28 may be positioned in their VTOL, STOL or cruise positions, automatically. The selector 57 may constitute conventional playback equipment of any type desired.

In actual practice angular movement of the upper and lower vanes 26–28 and 23–25, respectively, is determined as follows. With the upper and lower vanes in their cruise positions (FIGURE 3) angular movement is initially imparted simultaneously in a clockwise direction to the upper vanes 26–28. At this time it will be seen by referring to FIGURE 3 that the dimension of the nozzles 42, 43 and 44 are equal as indicated by the letter "t." Instantaneously as the dimension "t" would be reduced, due to further movement of the upper vanes 26–28, sufficient movement is imparted in a clockwise direction to the lower vanes 23–25 to maintain the cross-sectional dimension "t" of the throat constant. This procedure is followed as the upper and lower vanes are moved throughout their operational ranges.

In the embodiment shown in FIGURE 2 the specific angular movement of the upper and lower vanes 26–28 and 23–25, respectively may be seen by referring to the graph shown in FIGURE 6. By referring to the above mentioned graph and assuming that the upper and lower vanes are in their cruise positions (represented by the zero ordinates in FIGURE 3), it will be seen that angular movement of approximately three degrees (3°) is imparted to the upper vanes before any angular movement is imparted to the lower vanes 23–25. Relative movement of the upper vanes 26–28 with respect to the lower vanes 23–25, as these vanes are moved through their respective angular ranges, may also be ascertained by referring to the graph shown in FIGURE 6. For example, it will be seen that at such time as a clockwise movement of thirty degrees (30°) is imparted to the upper vanes 26–28, that is from their cruise position, a movement of approximately thirty-eight degrees (38°) is imparted to the lower vanes 23–25. Other relative movements of the upper and lower blades may be ascertained in the same manner.

Another embodiment of the thrust vectoring means is shown in FIGURE 7 and is identified generally by the numeral 22b. In FIGURES 7 and 8–10 the same numerals are utilized to identify the same components of the airplane 11 as those used in FIGURES 2–5 and comparable parts of the thrust vectoring means are identified by the same numerals as those used in FIGURES 2–5 with the addition of a prime.

Principal components of the thrust vectoring means 22b constitute fixed vanes 29'–32', inclusive; upper movable vanes 26'–28', inclusive; lower movable vanes 23'–25', inclusive; and additional operating components substantially as shown in FIGURES 2 and 3–5. The fixed vanes 29'–32' are mounted at the aft end of the tail pipe 19 and have the same relation with respect to each other and the tail pipe as the fixed vanes 29–32 as previously described in connection with FIGURES 2 and 3–5.

Both the upper and lower vanes 26'–28' and 23'–25', respectively, are secured for pivotal movement to the aft end of the fixed vanes 29'–32' by means of piano hinge-like connections. As attached to the fixed vanes 29'–32', and as assembled in the airplane 11, the pivotal axes of the upper vanes 27'–28' lie in a common plane identified by the letter "A," likewise the pivotal axes of the lower vanes 23'–25' lie in a common plane identified by the letter "B'." The included angle α, between the planes identified by the leters "A'" and "B'" and the longitudinal axis of the airplane 11 and the tail pipe 19, constitutes an acute angle of approximately 30°. The angle α, hereafter referred to as the rack angle of the thrust vectoring means 22b, also constitutes the angle between the longitudinal center line of the rack members 42', on the one hand, and the longitudinal center line of the airplane 11 and the axis of the tail pipe 19, on the other hand.

The upper and lower vanes 26'–28' and 23'–25', respectively, are substantially wedge shaped in cross-section as best seen in FIGURES 11 and 12. By referring further to these figures it will be seen that the upper and lower vanes have a nesting relation to provide a unitary vane at such time as the movable vanes are in their cruise positions as shown in FIGURE 8. As the upper and lower vanes are rotated in a clockwise direction through an angle of approximately 90°, during this movement the upper and lower vanes separate due to unequal angular movement imparted thereto, and are caused to assume their VTOL positions as shown in FIGURE 10. In traveling between their cruise and VTOL positions the upper and lower vanes pass through their STOL positions as shown in FIGURE 9. By referring to FIGURES 8, 9 and 10 it will be seen that vanes 29'–32', 23'–25' and 26'–28' cooperate to define convergent nozzles 42', 43' and 44' as the upper and lower vanes are moved through their respective angular ranges and a cascaded relation is imparted to the nozzles 42', 43' and 44' due to the rack angle α. Means for rotating and controlling the angular movement of the upper and lower vanes is identical to that described in connection with the embodiment of the thrust vectoring means 22a shown in FIGURE 2.

In actual practice, if it is assumed the upper and lower vanes are in their cruise positions, angular movement is first simultaneously imparted to the upper vanes 26'–28'. Movement of the upper vanes is continued, the lower vanes 23'–25' remaining in their cruise positions, until the exact moment at which further movement of the upper vanes would reduce the dimension "t'" of the nozzles 42' 43' and 44'. Instantaneously as the dimension "t'" about to be reduced, angular movement is imparted t the lower vanes 26'–28' sufficient to maintain the dimer sion "t'" constant.

Specific movement of the upper vanes 26'–28' wit respect to the lower vanes 23'–25' may be determined b referring to the graph shown in FIGURE 15. In th graph it will be seen that the upper vanes are rotated froi their cruise positions (represented by the zero ordinate in FIGURE 12) through an angle of approximately 20 before any movement is imparted to the lower vanes. B referring further to this graph it will be seen that for movement of 60° of the upper vanes a movement c only 20° will be imparted lower vanes.

Any suitable type of conventional reaction devices ma be utilized to maintain the stability of the airplane 1 during VTOL operations. Such devices are well know in the art and may be located adjacent the nose and ta of the airplane and on each of the wings 14.

While in order to comply with the statute, the inver tion has been described in language more or less specifi as to structural features, it is to be understood that th invention is not limited to the specific features shown, bt that the means and construction herein disclosed con prises a preferred form of putting the invention into effec and the invention is therefore claimed in any of its form or modifications within the legitimate and valid scop of the appended claims.

What is claimed is:

1. A deflector assembly for controlling and deflectin the flow of exhaust gases from an aircraft jet propulsio engine or the like comprising: an exhaust duct; a plurailt of fixed vanes mounted as a cascade in horizontal an vertical spaced relation in said duct; a plurality of mova ble vane assemblies constituting pairs of vanes pivotall mounted at the exit of said duct as rearward extensions c said fixed vanes for movement through an angular rang between cruise and VTOL positions; certain of said van assemblies including upper and lower vanes which ar nested together to provide a unitary vane at such time a said vane assemblies are in said cruise positions an positions adjacent thereto and a spaced relation whe moved throughout the remainder of their angular range: and said fixed and movable vane assemblies cooperatin to continuously define a plurality of convergent nozzle with the throat area of each nozzle maintained constai as the movable vanes are rotated in the same directio through their respective angular ranges.

2. A deflector assembly as set forth in claim 1: inclu ing a first linkage assembly linking said upper vanes tc gether and a second linkage assembly linking said lowe vanes together whereby unequal angular movements ma be imparted to said upper vanes with respect to sai lower vanes.

3. A deflector assembly as set forth in claim 2: sai fixed, upper and lower vanes cooperating to define unitary vane of streamlined configuration at such times a said upper and lower vanes are in their cruise position:

4. A deflector assembly for controlling and deflectin the flow of exhaust gases from an aircraft jet propulsio engine or the like comprising: an exhaust duct; a plurailt of fixed vanes mounted as a cascade in horizontal an vertical spaced relation in said duct; a plurality of mova ble vanes mounted at the exit of said duct for pivota movement between cruise and VTOL positions; said fixe and movable vanes having a contacting relation in whic they cooperate to define a plurality of streamlined vane at such time as said movable vanes are in their cruis positions; said fixed and movable vanes as assembled i said duct cooperating to continuously define a plurality o convergent nozzles having a constant throat area as th movable vanes are rotated in the same direction through their respective angular ranges, said movable vanes constituting sets of vanes, each set of movable vanes comprising a pair of movable vanes cooperating with each other to maintain the cross-sectional areas of the throats of said nozzles continuously constant as the movable vanes are pivotally moved in the same direction throughout their respective ranges and one vane of each of said sets of vanes having a nested and sliding relation with respect to one of said fixed vanes.

References Cited in the file of this patent

UNITED STATES PATENTS

| | | |
|---|---|---|
| 2,799,989 | Kappus | July 23, 1957 |
| 2,918,232 | Lippisch | Dec. 22, 1959 |
| 2,928,238 | Hawkins | Mar. 15, 1960 |
| 2,940,252 | Reinhart | June 14, 1960 |

FOREIGN PATENTS

| | | |
|---|---|---|
| 764,180 | Great Britain | Dec. 19, 1956 |